United States Patent
Tcherny

[19]

[11] Patent Number: 6,042,068
[45] Date of Patent: Mar. 28, 2000

[54] LOW PROFILE LCD PROJECTOR MOUNT

[75] Inventor: Joseph Tcherny, Clenview, Ill.

[73] Assignee: Peerless Indsutries, Inc., Melrose Park, Ill.

[21] Appl. No.: 08/923,716

[22] Filed: Sep. 4, 1997

[51] Int. Cl.$^7$ ................................................ A47H 1/10
[52] U.S. Cl. .................... 248/221.11; 248/317; 248/324; 248/917; 248/923
[58] Field of Search .................... 248/221.11, 222.11, 248/291.1, 323, 324, 343; 52/39; 403/316, 380

[56] References Cited

U.S. PATENT DOCUMENTS

| | | | |
|---|---|---|---|
| 2,186,607 | 1/1940 | Judge et al. | 248/343 |
| 2,375,438 | 5/1945 | Regehardt | 403/316 X |
| 4,094,485 | 6/1978 | O'Callaghan | 248/222.11 |
| 4,113,217 | 9/1978 | O'Connell | 248/222.11 |
| 4,189,250 | 2/1980 | Abbot et al. | 403/316 X |
| 4,470,716 | 9/1984 | Welch | 403/316 X |
| 4,580,754 | 4/1986 | Hughes | 248/323 |
| 4,651,963 | 3/1987 | Busse et al. | 248/323 |
| 4,738,423 | 4/1988 | DiFilippo et al. | 248/291.1 X |
| 4,747,570 | 5/1988 | Takahashi | 248/309.1 |
| 5,139,223 | 8/1992 | Sedighzadeh | 248/324 |
| 5,490,655 | 2/1996 | Bates | 248/329 |
| 5,621,846 | 4/1997 | Smith et al. | 248/324 X |

*Primary Examiner*—Derek J. Berger
*Attorney, Agent, or Firm*—Vedder Price Kaufman & Kammholz

[57] ABSTRACT

A mount that secures a projector to a ceiling is disclosed. The mount includes an upper element which is attached to the ceiling, and a lower element which is attached to the projector. The two elements are adapted to slidably engage and disengage for quick mounting without having to detach the upper element from the ceiling and the lower element from the projector. The mount may include a spring-biased latch which locks the two elements together to prevent accidental disengagement. The latch may include a safety lock feature which prevents inadvertent actuation of the latch and subsequent disengagement of the elements.

17 Claims, 3 Drawing Sheets

LOW PROFILE LCD PROJECTOR MOUNT

BACKGROUND OF THE INVENTION

The present invention relates generally to supporting structures for video and data projectors and more particularly to a means, device or apparatus for mounting such projectors to a ceiling.

Although video and data projectors have been available for quite some time, they are still an integral part of the daily functioning of many businesses presentations, educational teaching methods, and even home recreational viewing. Typically these projectors would rest on a conference room table in the case of a business presentation; rest on a student's desk in the case of classroom teaching; or be placed upon any available furniture space in the case of recreational viewing at home.

The associated problems with the random placement of the projector so as to enable adequate viewing under these circumstances could become rather costly. When the projector is just resting on a piece of furniture in a room, it both takes up space and is often in the way of someone trying to get by or in the way of someone trying to view its projection. This creates an unprofessional atmosphere with which to do business in the case of a business presentation and an undesirable situation with which to learn in the case of classroom teaching. When at home, the user tends to become frustrated with the machine and the desired purpose of relaxing is defeated.

Attempts within the art to alleviate these problems have focussed on the concept of either mounting the projector on the ceiling or on the wall. What became a common mounting method was a system which utilized a 2 inch metal water pipe with a flange screwed onto each end. One flange was used to affix the mounting structure to the ceiling, while the other flange was attached to the projector. In the wake of solving some of the aforementioned problems, this mounting method unfortunately created a number of new problems. Foremost is the problem of assembly and installation. Because each installation will be different, the installers have to use pipe cutting and threading machines, which is time consuming, labor intensive and costly. There is also a question of safety with this method due to the cutting of threads into the piping and its subsequent weakening.

Probably the most widely used method of mounting a projector to the ceiling has been by the use of a single piece permanent mounting bracket. This device attaches to the projector on one side, and to the ceiling on the other. Although this requires minimal space, there exists the problem when the user wants to remove the projector for service or when it is in the way. This requires the use of a number of tools and may become very tedious when the space with which the user is working is small.

In light of these preceding problems, there has been an effort in the art to develop mounting apparatus for projectors that do not require threaded water pipe structures and at the same time are not permanently affixed to the ceiling. For example, U.S. Pat. No. 5,490,655 issued Feb. 13, 1996 describes a mount that secures a projector to a ceiling by the use of struts that form channels which support a projector/monitor and provide alternate channels for video and AC cabling to reduce interference. This apparatus, although structurally sound, is built in such a manner so as to require an undesirable amount of space for the mount to be positioned within. This in part defeats the purpose of reducing needed space by mounting it on the ceiling. Furthermore, such an apparatus is designed in a manner that is not aesthetically appealing.

In view of the aforementioned needs and the shortcomings of the prior art, it is therefore an object of the present invention to provide an apparatus that overcomes the deficiencies of the current practices whereby an apparatus is provided for mounting a projector on the ceiling.

It is another object of the present invention to provide a projector mounting apparatus imparting a low profile characteristic.

It is another object of the present invention to provide a projector mounting apparatus which utilizes a combination of a slidably separable two-part mount, which is slidably controlled by a biased latch.

Still another object of the present invention is to provide a two-part projector mount adapted to slidably engage and disengage for quick mounting without having to detach the upper part of the mount from the ceiling or the lower part of the mount from the projector.

Still another object of the present invention is to provide a two-part projector mount with a safety latch so that the mount will stay assembled together until intentional, definitive acts are taken by the user.

It is yet another object of the present invention to provide a two-part projector mount which can be easily disassembled so as to store the projector when not in use.

Yet another object of the present invention is to provide a two-part projector mount which adjusts to enable the projector to be positioned at various angles.

Still another object of the present invention is to provide a two-part projector mount which requires a minimal amount of space and further is aesthetically appealing both during use and when the projector is disengaged.

These and other objects, features and advantages of the present invention will be clearly understood through a consideration of the following detailed description.

SUMMARY OF THE INVENTION

According to the present invention, there is provided a low profile projector mount having an upper element and a lower element. The upper element is attached to the ceiling and has slide guides projecting from its bottom surface. The lower element is attached to the projector and has flanges in slidable engagement with the guides. The upper element further has a means for securing the engagement of the slide guides and the flanges comprising a spring-biased latching mechanism.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
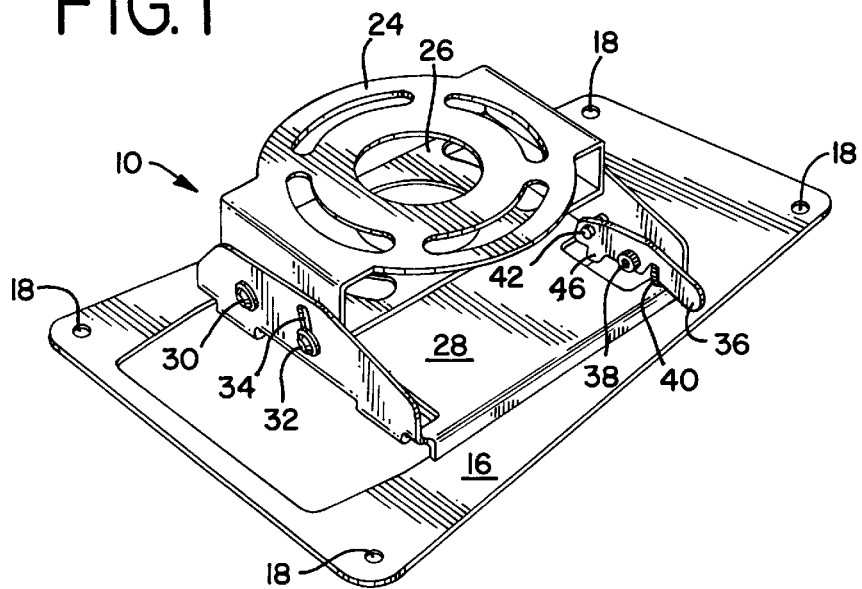
FIG. 1 is a perspective view of a preferred embodiment of the projector mount constructed in accordance with the present invention.
Figure 2:
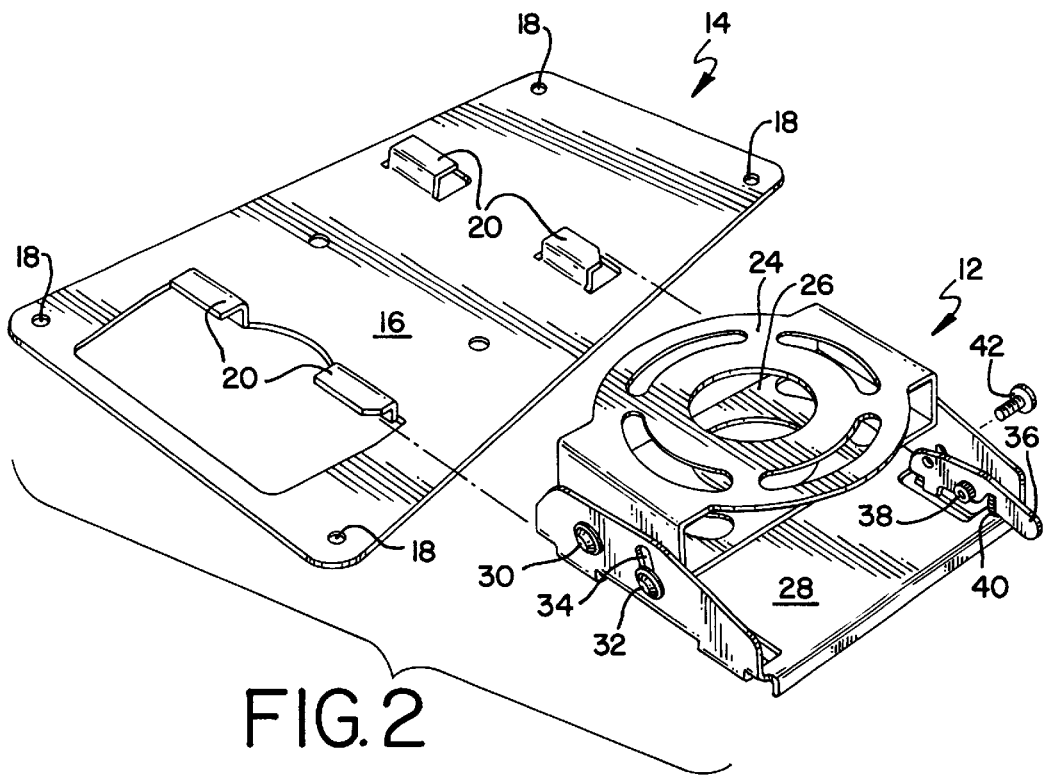
FIG. 2 is a perspective view of the two-part projector mount of FIG. 1 illustrating the lower plate disengaged from the upper element.
Figure 3:
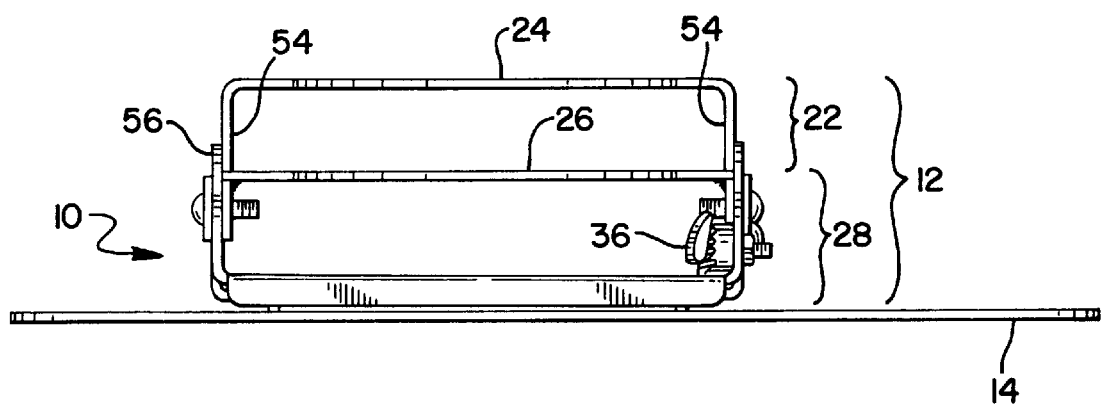
FIG. 3 is a front elevation view of the projector mount illustrated, in FIGS. 1 and 2.
Figure 4:
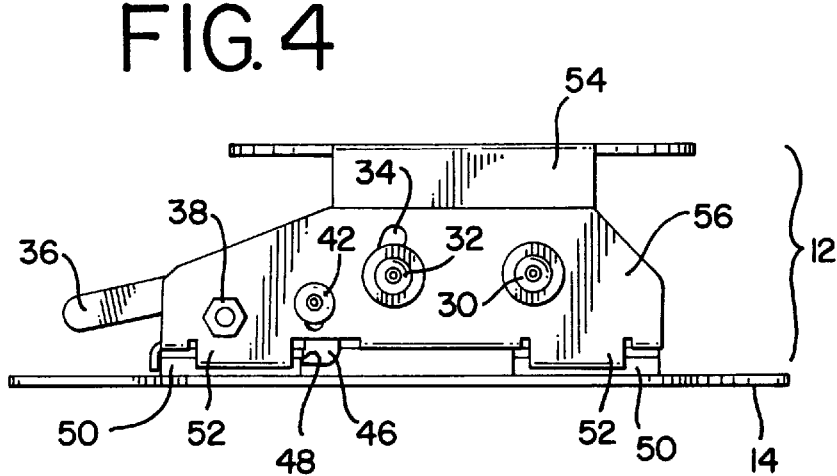
FIG. 4 is a side elevation view of the projector mount illustrated in FIGS. 1 and 2.

FIG. 1 illustrates a two-part projector mount generally designated at 10, constructed in accordance with the principles of the present invention. The mount 10 consists of two parts, best shown in FIG. 2, an upper element generally designated at 12, and a lower element generally designated at 14. The lower element 14 consists of a plate 16 with a plurality of apertures 18. Such apertures 18 enable the lower element 14 to be screwed into a projector. It will be appreciated that the preferred embodiment is to be used with projectors, and particularly lightweight Liquid Crystal Display (LCD) projectors. In particular, the projector mount as deposited in the figures is adapted for mounting NEC models MT810 or MT1000 Video Projectors. However, it is understood that the present invention is not limited to such LCD embodiments and can be readily adapted to support a larger and perhaps heavier projector. The plate 16 further has a plurality of flanges 20 projecting atop its upper surface.

The upper element 12 of the mount 10 includes a ceiling plate assembly 22 which consists of a ceiling plate 24 and a reinforcement member 26. The ceiling plate assembly 22 is attached to a main bracket 28 of the upper element 12 by the use of a pair of hex nuts 30 or other appropriate fastening elements. Adjacent to the hex nuts 30 are another pair of adjustable hex nuts 32 which ride along sliding apertures 34 so as to provide the projector with a means to vary the angle of projection.

Figure 5:
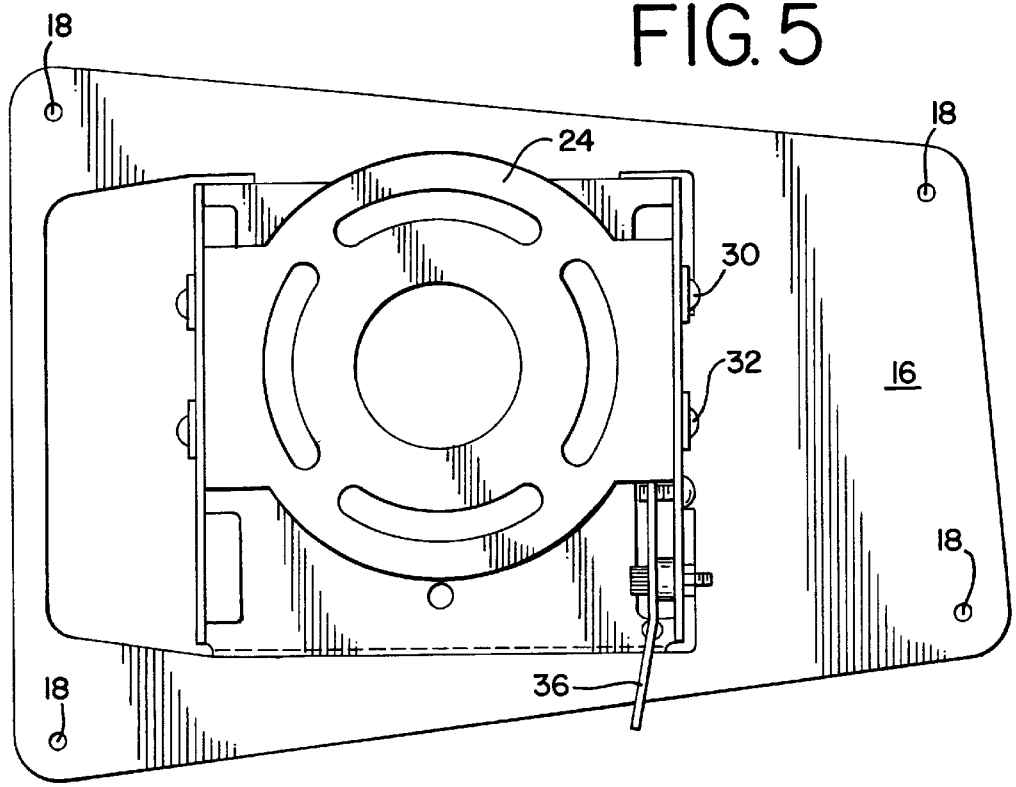
FIG. 5 is a top plan view of the illustrated projector mount, more particularly depicting the surface which opposes the ceiling or the like from which the projector is be mounted.
Figure 6:
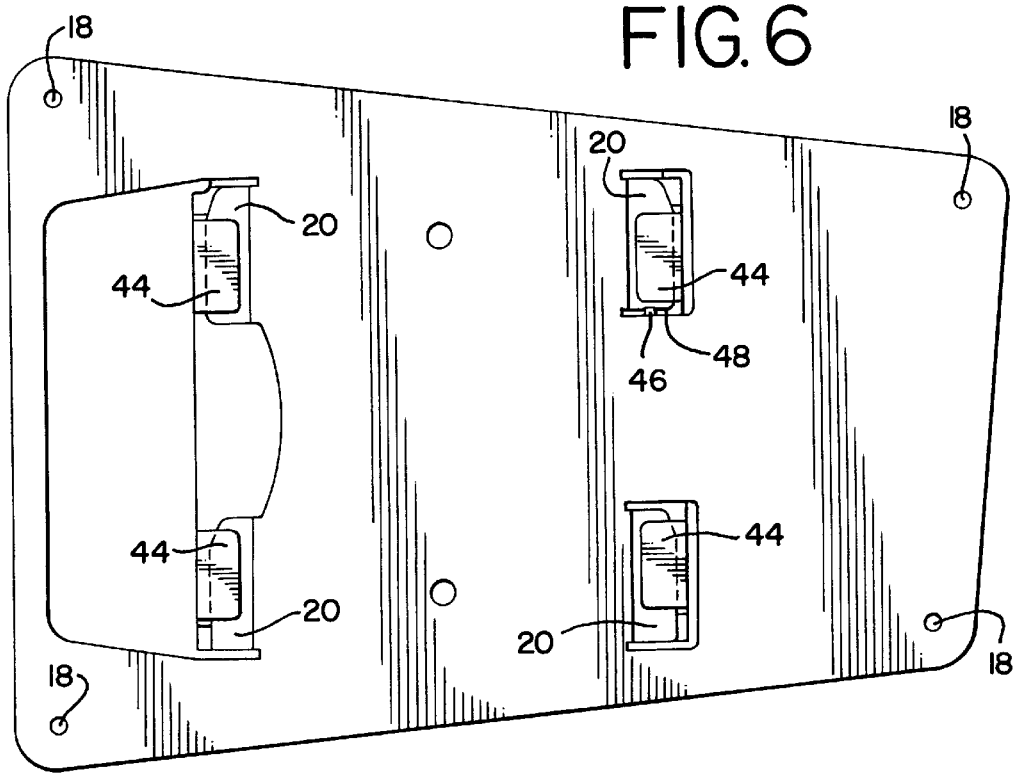
FIG. 6 is a bottom plan view of the illustrated projector mount.

Mounted upon the main bracket 28 is a latch. In the illustrated arrangement, the latch is a pivotal latch 36 which is secured by pivot 38 and biased in a closed orientation such as by a spring 40 or the like. A safety lock may be positioned on the latch in order to prevent unintentional opening of the latch. The illustrated lock comprises a safety hex nut 42 which passes through both the main bracket 28 and the latch 36. The use of the latch 36 is best shown in FIGS. 5–6 where one can see the relationship between the flanges 20 of the lower element 14 and the downwardly depending slide guides 44 of the upper element 12. It will be noted that the illustrated latch 36 has a hook 46 for releasably engaging an edge 48 of one of the flanges 20.

The spring-biased latch 36 which is illustrated is provided so that the two-part mount will stay assembled together until intentional, definitive acts are taken by the user. These acts include depressing the lever so as to move the latch out of the way, that is out of engagement with the flange edge 48, followed by sliding movement of the lower element 14 with respect to the upper element. This spring-biased latch 36 engages a flange 20 of the lower element 14 when the slide guides 44 of the upper element are fully engaged with the flanges 20 of the lower element 14. This latch mechanism is further secured by a screw which passes through it and which screws into the frame of the main bracket 28 of the two-piece mount 10.

It will be noted that the upper element 12 is adapted to be mounted to a wood joist or the like within substantially the ceiling to which it is to be secured. Flanges 20 upwardly depend for a relatively short distance, approximately that of the depth of the protruding portion 50 of each flange 20. In addition, the lower element 14 exhibits a substantially low profile yet allows for adequate access between the ceiling and a projector mounted to it. With further reference to the low profile aspect, the downwardly protruding portion 52 of each downstanding slide guide 44 has a shallow depth, and the lower element 14 is thus very closely spaced from the ceiling after mounting has been effected. Furthermore, the ceiling plate 24 has a low-profile depth by virtue of its relatively shallow ears 54 (typically not greater than about 2 inches) and the relatively shallow flanges 56 of the main bracket 28 (typically not greater than about 2 inches) to which the ceiling plate 24 is secured.

Initial assembly and any subsequent engagement/disengagement are facilitated by the design of the present embodiment. In order to secure the upper element 12 of the mount 10 into a ceiling, one need only to determine where the desired location of the projector is to be and then simply screw the upper element flush into the ceiling. Attachment of the lower element 14 to the projector requires only a determination of the correct size, shape and receptor configuration for the plate 16 to be used with that projector. Once a plate 16 is chosen, it is only a matter of bolting or otherwise securely fastening the plate onto the projector. The ceiling plate 24 together with its reinforcement 26 comprise the ceiling plate assembly 22, which is bolted to the main bracket 28 of the upper element 14, before the ceiling plate is secured to the ceiling.

The projector, along with the lower element which remains attached thereto, is then slidably engaged with the upper element via upstanding flanges 20 and downwardly depending slide guides 44. When the upper and lower elements are fully engaged, the latch 36 will snap into place and keep the elements together until deactivation of the latch by the user. For additional safety, the safety lock 44 locks and couples the latch 36 to the main bracket 28 so as to prevent any inadvertent activation of latch 36 and subsequent unintentional disengagement of the elements.

Once locked in place, the projector can be pivoted to a desired projection orientation. In the arrangement depicted, this is accomplished by loosening and tightening the hex nuts 30 securing the main bracket 28 to the ceiling plate assembly 22, as well as the pair of adjustable hex nuts 32 and their respective sliding apertures 34.

Although the low profile combination of the upper and lower element of the mount provides an advantageous apparatus, the sliding members and associated latch 36 enable easy access to remove the lower element and the projector without disturbing the secure and substantially permanent fixture provided by the upper element 12.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An audiovisual projector ceiling mount, comprising:

an upper element adapted for attachment to a ceiling, said upper element having a top surface and a bottom surface, said upper element further including a slide guide projecting from said bottom surface;

a lower element adapted for attachment to a projector, said lower element having a top surface and a bottom surface, said lower element further including a flange projecting from said top surface, said flange being in slidable engagement with said slide guide of said upper element and said flange defining an interior space of said ceiling mount between said flange and said upper element top surface; and one of said upper and lower elements further including a securement component for maintaining said slidable engagement between said upper element and said lower element, said securement component including a latch disposed in said interior space which engages said other element to maintain the engagement of said upper element and said lower element, said latch further including a hook, and said latch hook further engaging said flange when said upper and lower elements are engaged together.

2. An audiovisual projection ceiling mount as described in claim 1, wherein said upper element includes, the plate having an upper surface for engaging a ceiling component, the plate upper surface constituting said upper element top surface.

3. An audiovisual projector ceiling mount as described in claim 1 wherein said lower element includes a plate having an aperture, said plate and aperture being adapted to supportingly receive a particular projector.

4. An audiovisual projector ceiling mount as defined in claim 3 wherein said lower element further includes a member for adjusting the angle of said plate relative to said upper element.

5. An audiovisual projector ceiling mount as described in claim 1 wherein said latch is a biased latch pivotably coupled to said one of said elements.

6. An audiovisual projector ceiling mount as described in claim 1 wherein said securement component includes a biasing component which urges said latch to maintain said engagement position.

7. An audiovisual projector ceiling mount as described in claim 6 wherein said biasing component includes a spring.

8. An audiovisual projector ceiling mount as defined in claim 1, wherein said securement component includes a biased latch pivotably coupled to said one of said upper and lower elements, said hook being disposed at one end of said latch and said latch having an engagement position at which said latch engages said other element of said upper and lower elements to maintain the engagement of said upper element and said lower element.

9. An audiovisual projector ceiling mount as defined in claim 8 wherein said securement component includes a biasing component which urges said latch to maintain said engagement position.

10. An audiovisual projector ceiling mount as defined in claim 9 wherein said biasing component comprises a spring.

11. An audiovisual projector ceiling mount, comprising:

an upper element adapted for attachment to a ceiling, said upper element having a top surface and a bottom surface, said upper element further including a slide guide protecting from said bottom surface;

a lower element adapted for attachment to a projector, said lower element having a top surface and a bottom surface, said lower element further including a flange projecting from said top surface, said flange being in slidable engagement with said slide guide of said upper element; and one of said elements further includes a securement component for maintaining said slidable engagement between said upper element and said lower element, said securement component includes a latch which engages said other element to maintain the engagement of said upper element and said lower element, and said latch further includes a member for locking said latch whereby inadvertent actuation of said latch and subsequent unintentional disengagement of said elements is prevented.

12. An audiovisual projector ceiling mount as defined in claim 11 wherein said locking member includes a bolt through said latch to lock it relative to said one of said elements.

13. An audiovisual projector ceiling mount comprising;

an upper element adapted for attachment to a ceiling, said upper element having a top surface and a bottom surface interconnected by two side walls, said upper element further including a slide guide projecting from said bottom surface;

a lower element adapted for attachment to a projector, said lower element having a top surface and a bottom surface, said lower element further including a flange projecting away from said top surface, said flange being in slidable engagement with said slide guide of said upper element when said upper and lower elements are engaged together, said upper and lower elements cooperatively defining, between said upper element bottom surface and said lower element flange, an interior space of said ceiling mount;

one of said elements having a length imparting a low-profile characteristic to the mount, said length being defined by a distance between said top surface of the upper element and said bottom surface of the lower element of said interior space; and one of said elements further includes a securement component for maintaining said engagement between said upper element and said lower element, said securement component including a hook that engages said lower element flange when said lower and upper elements are engaged together, said hook being disposed within said interior space and intermediate said upper element sidewalls.

14. An audiovisual projector ceiling mount as defined in claim 13 wherein said length imparting said low profile characteristic is not greater than about 10 cm.

15. An audiovisual projector ceiling mount as defined in claim 13, wherein said upper element includes a plate having an upper surface for engaging a ceiling component, said plate upper surface constituting said upper element top surface.

16. An audiovisual projector ceiling mount as defined in claim 13 wherein said lower element includes a plate having an aperture, and said plate and aperture are adapted to supportingly receive a particular projector.

17. An audiovisual projector ceiling mount, comprising:

an upper element for attaching to a ceiling, said upper element having a top surface and a bottom surface interconnected by opposing sidewalls, said upper element further including at least one slide guide projecting from said bottom surface and aligned with an opening formed in said upper element bottom surface;

a lower element for attaching to a projector, said lower element having a top surface and a bottom surface, said lower element further including at least one flange disposed thereon and projecting from said top surface, said slide guide and said flange being in slidable engagement, and said lower element flange being accessible through said upper element opening when said flange is aligned with said slide guide;

one of said upper and lower elements further including a latch member for securing said said upper element and said lower element in engagement with each other; and said latch member being aligned with said upper element opening and further being manipulatable into engagement with said upper element flange to secure said upper element to said lower element.

* * * * *